(12) United States Patent
Sugiyama et al.

(10) Patent No.: US 7,382,948 B2
(45) Date of Patent: Jun. 3, 2008

(54) OPTICAL SWITCH

(75) Inventors: Takanori Sugiyama, Watarai-gun (JP);
Yoshihiro Mihara, Matsusaka (JP);
Tsutomu Shimomura, Toyonaka (JP);
Mitsuo Ichiya, Suita (JP); Yuichi Niimura, Shijonawate (JP); Sachiko Mugiuda, Osaka (JP)

(73) Assignee: Matsushita Electric Works, Ltd., Osaka (JP)

(*) Notice: Subject to any disclaimer, the term of this patent is extended or adjusted under 35 U.S.C. 154(b) by 0 days.

(21) Appl. No.: 10/596,393

(22) PCT Filed: Sep. 29, 2005

(86) PCT No.: PCT/JP2005/017922

§ 371 (c)(1),
(2), (4) Date: Jun. 12, 2006

(87) PCT Pub. No.: WO2006/035855

PCT Pub. Date: Apr. 6, 2006

(65) Prior Publication Data

US 2007/0081762 A1 Apr. 12, 2007

(30) Foreign Application Priority Data

Sep. 29, 2004 (JP) .............................. 2004-283813

(51) Int. Cl.
*G02B 6/35* (2006.01)
*G02B 6/32* (2006.01)
*G02B 6/34* (2006.01)

(52) U.S. Cl. ............................ 385/18; 385/22; 385/33; 385/36

(58) Field of Classification Search .................. 385/16, 385/18, 22, 33, 36, 88–92
See application file for complete search history.

(56) References Cited

U.S. PATENT DOCUMENTS 4,854,658 A * 8/1989 Stanley .......................... 385/18
6,438,283 B1 * 8/2002 Karaguleff et al. ........... 385/18
6,647,173 B2 * 11/2003 Chen et al. .................... 385/18

(Continued)

FOREIGN PATENT DOCUMENTS

JP        56-107201        8/1981

(Continued)

OTHER PUBLICATIONS

English Language Abstract of JP 2003-248180.

(Continued)

*Primary Examiner*—Sarah Song
(74) *Attorney, Agent, or Firm*—Greenblum & Bernstein, P.L.C.

(57) ABSTRACT

An optical switch comprises a prism for changing the direction of travel of incident light to be directed toward a further optical fiber; a switching mirror placed to be insertable and removable into and from between a lens block and the prism; and an actuator for driving the mirror, in which incident and emitting optical fibers are placed in the same facing, i.e. on one surface side, of the device body. This structure makes it possible for components to be used in common and integrated, and for the coupling surfaces between the lens block and the optical fibers to be gathered together in one place, thereby enabling cost reduction and size reduction.

15 Claims, 4 Drawing Sheets

U.S. PATENT DOCUMENTS

| | | |
|---|---|---|
| 6,829,404 B2 | 12/2004 | Sugiyama et al. |
| 6,965,710 B2 | 11/2005 | Makio |
| 2003/0053744 A1 | 3/2003 | Makio |
| 2003/0081897 A1 | 5/2003 | Itoh et al. |
| 2003/0138219 A1* | 7/2003 | O'Toole et al. ............... 385/92 |

FOREIGN PATENT DOCUMENTS

| | | |
|---|---|---|
| JP | 2003-015059 | 1/2003 |
| JP | 2003-195012 | 7/2003 |
| JP | 2003-248180 | 9/2003 |

OTHER PUBLICATIONS

English Language Abstract of JP 56-107201.
English Language Abstract of JP 2003-195012.
English Language Abstract of JP 2003-015059.

* cited by examiner (a)

(b)

OPTICAL SWITCH

TECHNICAL FIELD

The present invention relates to an optical switch for switching combinations of optical paths between a plurality of optical fibers.

BACKGROUND ART

Conventionally, an optical switch is known in which a prism is provided to be insertable and removable into and from between collimating lenses optically coupled to a plurality of optical fibers, respectively, so as to switch the optical paths between the lenses based on the presence or absence of the prism (refer to Japanese Laid-open Patent Publication 2003-015059).

DISCLOSURE OF INVENTION

However, in the structure disclosed in the above patent document, a plurality of collimating lenses which account for most of the component cost is used, so that it is difficult to reduce the cost of the optical switch. Further, input and output optical systems are arranged to face each other, so that it requires spaces to hold the optical systems and spaces to seal the optical fibers in many locations, making it difficult to reduce the size of the optical switch.

The present invention has been made in view of the above reasons, and it is an object of the present invention to provide an optical switch which makes it possible to reduce the cost and size by integrating and using components in common.

To achieve the above object, the present invention provides an optical switch for switching combinations of optical paths between a plurality of optical fibers, comprising: a device body with at least three optical fibers being led out therefrom; and an optical block for switching housed in the device body so as to be optically coupled to the respective optical fibers, the optical block comprising: a lens block having one surface side to place the optical fibers on, and having a plurality of collimating lenses placed side by side in the device body; a prism which is placed distantly from the lens block on the other surface side of the lens block such that the direction of travel of light incident from the optical fibers through the collimating lens is changed to be directed toward a further optical fiber; a switching mirror placed to be insertable and removable into and from between the lens block and the prism; and an actuator for driving the mirror, wherein the respective optical fibers are led out from the one surface side of the device body.

According to the present invention, the respective optical fibers are led out from one surface side of the device body, so that it becomes possible to reduce the size as compared with prior art, and furthermore that spaces to seal the optical fibers as in the prior art are reduced, thereby achieving size reduction of the optical switch.

Preferably, the lens block has the plurality of integrally formed collimating lenses. By using the integrally formed lens block, it is possible to improve the optical characteristics, and to reduce the number of components as compared with the prior art in which the collimating lenses are discretely formed, thereby enabling cost reduction.

Further preferably, the lens block has fixed thereto ferrules holding the respective optical fibers, respectively. This makes it possible to reduce misalignment of optical axes between the optical fibers and the collimating lenses.

Still preferably, the bonding surfaces between the lens block and the ferrules are formed by planes inclined at an angle to at least some extent relative to planes perpendicular to axes of passing light beam. This makes it possible to achieve reduction of the return losses by return light reflected at the bonding surfaces between the lens block and the ferrules.

Still further preferably, the optical block comprises one optical bench contained in and mounted on the device body for positioning and fixing the lens block the prism and the actuator. This allows the optical block to be fixed to one optical bench, so that it is possible to improve the positioning accuracy, and improve the optical characteristics.

BRIEF DESCRIPTION OF DRAWINGS

FIG. 1(a) is a plan view of an optical switch, with its cover being cut into a cross-section, according to an embodiment of the present invention, and FIG. 1(b) is a cross-sectional front view of the same optical switch, while FIG. 1(c) is a side view of the same optical switch;

FIG. 3(a) is a cross-sectional side view of the same optical switch in the absence of a mirror, while FIG. 3(b) is a cross-sectional side view of the same optical switch in the presence of the mirror; and FIG. 4(a) is a view showing a path of an optical beam in the same optical switch in the absence of the mirror, while FIG. 4(b) is a view showing a path of an optical beam in the same optical switch in the presence of the mirror.

BEST MODE FOR CARRAYING OUT THE INVENTION

Figure 1:
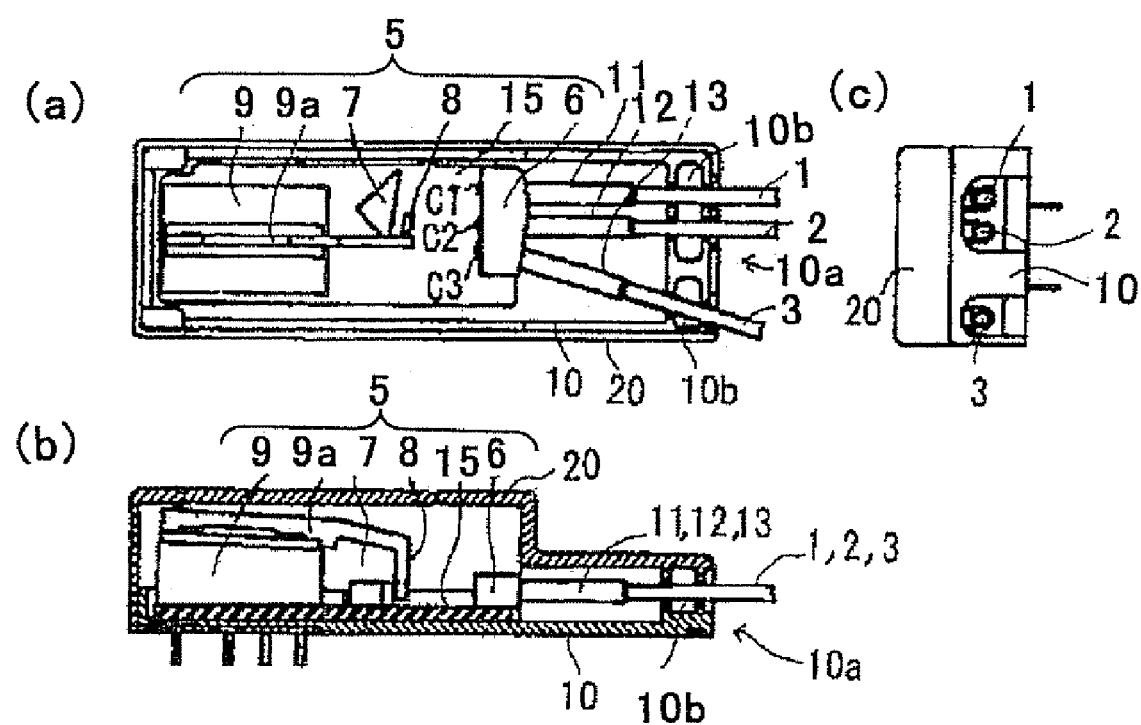
Figure 2:
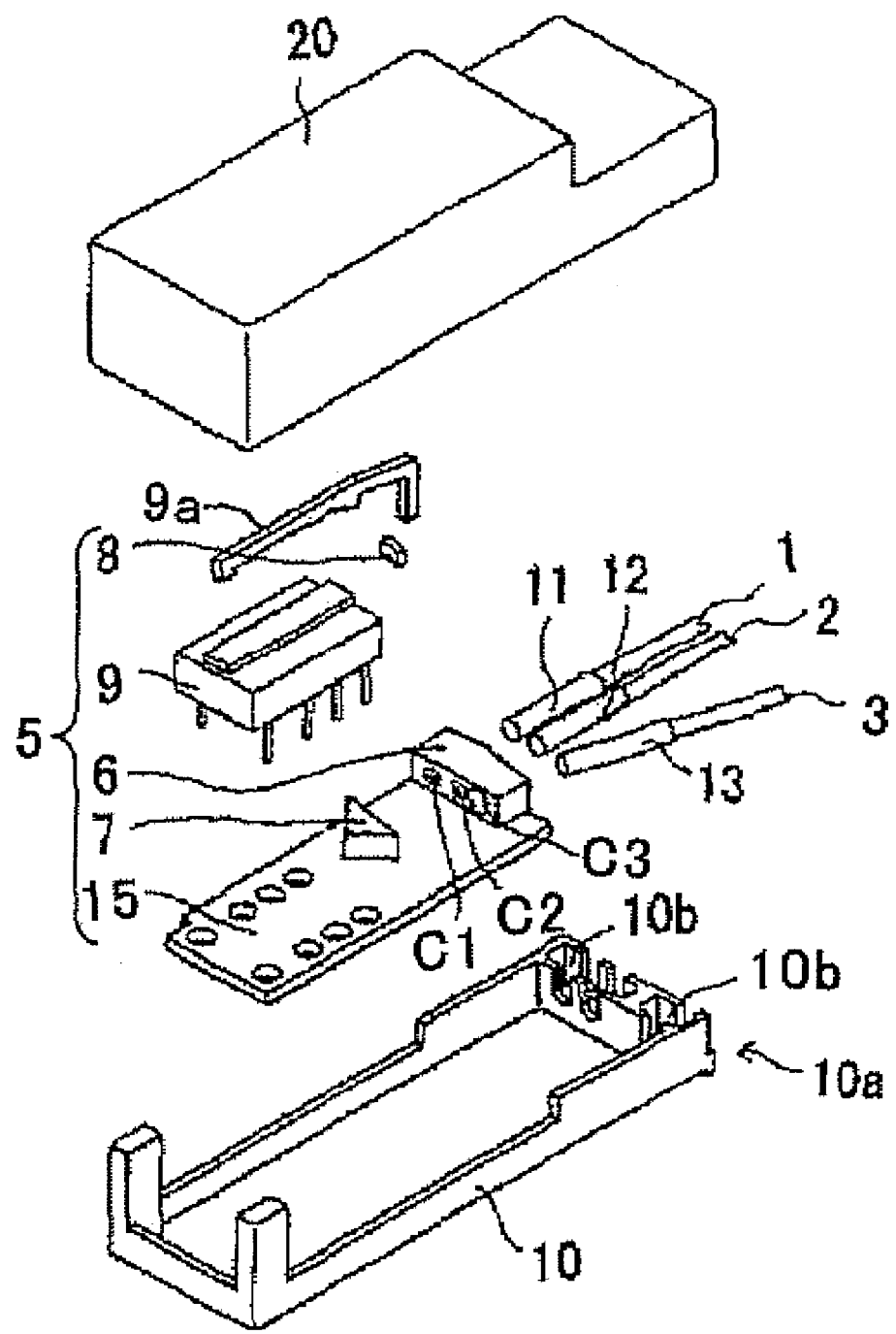
FIG. 2 is an exploded perspective view of the same optical switch.

Hereinafter, an optical switch according to an embodiment of the present invention will be described with reference to the drawings. Referring to FIG. 1 and FIG. 2, the optical switch comprises a device body 10 with three optical fibers 1, 2, 3 being led out from one surface side 10a of the device body 10, and comprises an optical block 5 for switching housed in the device body 10 so as to be optically coupled to the respective optical fibers 1, 2, 3. The optical block 5 comprises: a lens block 6 having one surface side to place the optical fibers 1, 2, 3 on, and having a plurality of integrally formed collimating lenses C1, C2, C3 placed side by side in the device body 10; a prism 7 which is placed distantly from the lens block 6 on the other surface side of the lens block 6 such that the direction of travel of light incident from the optical fibers 1, 2, 3 through the collimating lens 6 is changed to be directed toward a further optical fiber; a switching mirror 8 placed to be insertable and removable into and from an optical path between the lens block 6 and the prism 7; and an actuator 9 for driving the mirror 8.

The lens block 5 forms one lens having plural optical axes by placing the plurality of collimating lenses C, C2, C3 side by side. Further, the collimating lenses C1, C2, C3 respectively have the same focal length, and have optical coupling surfaces of the optical fibers 1, 2, 3 at the respective focal points. The prism 7 is a rectangular prism, and has two rectangular surfaces to reflect, once at each surface, light incident from the bottom surface thereof, so as to reverse the direction of the incident light with the optical axis being translated. The mirror 8 is held at an end of a drive arm 9a of the actuator 9. The actuator 9 receives a control signal from outside to seesaw the drive arm 9a so as to insert and remove the mirror 8 into and from the optical path, thereby to switch the direction of travel of the light.

The respective optical fibers 1, 2, 3 are bonded to the lens block 6 via ferrules 11, 12, 13 holding the optical fibers, respectively. At this time, the ferrules 11, 12, 13 (with the optical fibers 1, 2, 3 passing through central portions thereof) are provided with optical axis alignment, and fixed to the lens block 6 with an adhesive. Further, in the present embodiment, the optical fibers 1, 2 are parallel, and the optical fiber 3 is placed at a predetermined angle relative to the optical fibers 1, 2. The respective optical fibers 1, 2, 3 are positioned by grooves provided in, and led out from, a side wall of the surface side 10a of the device body 10, and are sealed by a resin filled in resin retainers 10b.

The bonding surfaces, i.e. optical coupling surfaces, between the lens block 6 and the ferrules 11, 12, 13 are formed by planes inclined at an angle to at least some extent relative to planes perpendicular to axes of the passing light beam, in order to reduce the return losses by return light reflected at the optical coupling surfaces. This will be described in detail with reference to FIG. 4 later. The optical block 5 comprises an optical bench 15, as one base plate, for positioning and fixing the lens block 6, the prism 7 and the actuator 9. This optical bench 15 is contained in and mounted on the device body 10. The device body 10 has a shape of box with an open upper surface, inside which the optical bench 15 is positioned and fixed, with a cover 20 being covered from above the upper surface.

Figure 3:
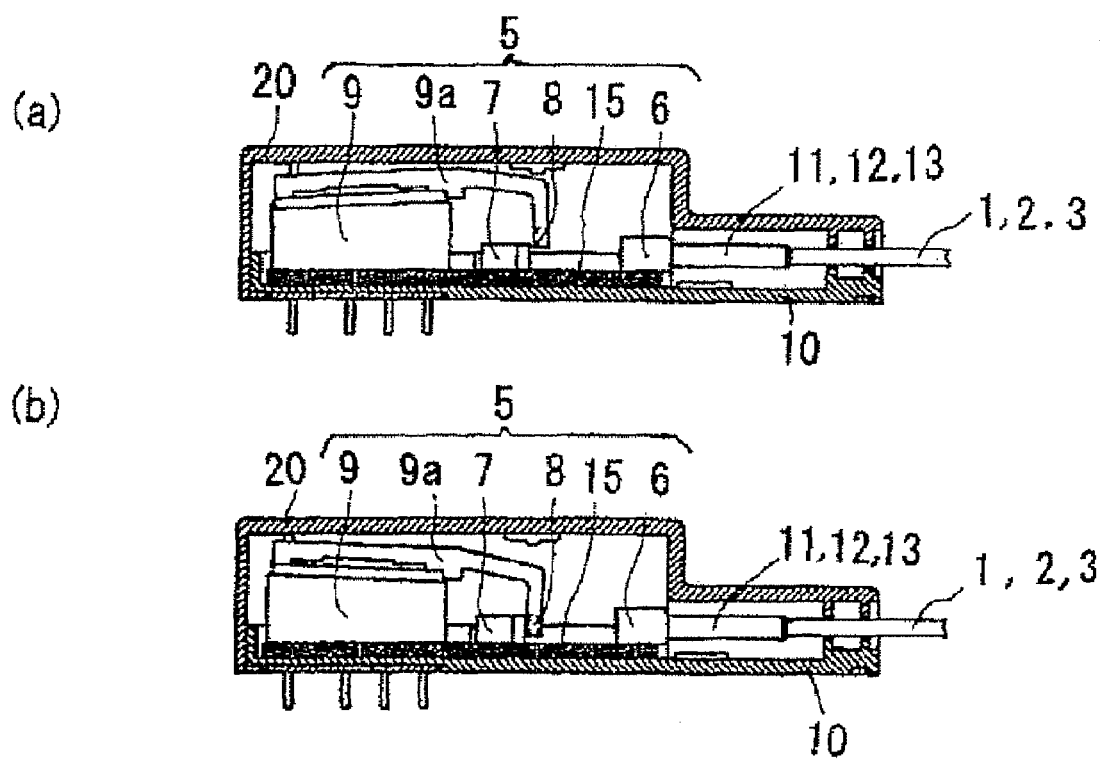
Figure 4:
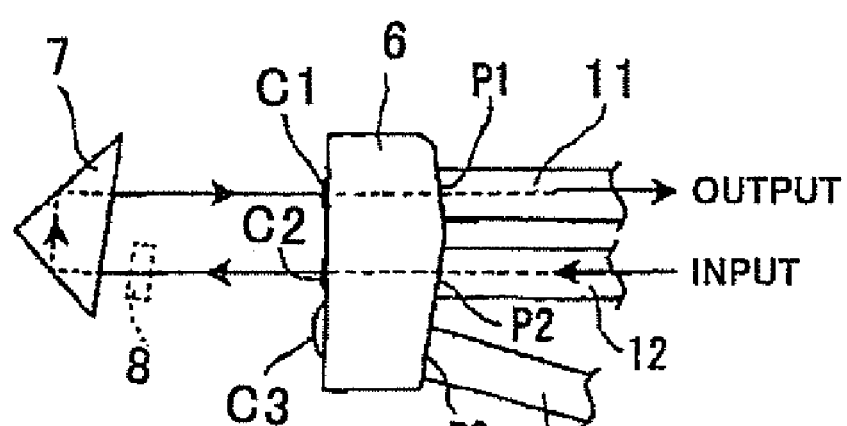
Figure 4:
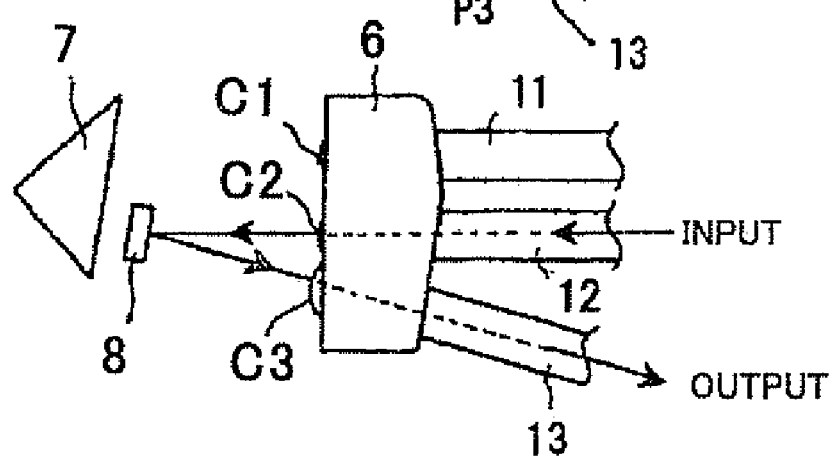

FIG. 3 and FIG. 4 describe an operation of the optical switch according to the present embodiment, in which FIG. 3(a) and FIG. 4(a) show a state where the mirror 8 is absent in the optical path between the lens block 6 and the prism 7, while FIG. 3(b) and FIG. 4(b) show a state where the mirror 8 is present in the optical path between the lens block 6 and the prism 7. Before describing the operation, the following describes, with reference to FIG. 4, details of the placement and structure of the lens block 6 (collimating lens C1, C2, C3), the mirror 8 and the prism 7, as well as the structure of the optical coupling between the lens block 6 and the ferrules 1, 12, 13, in the optical switch according to the present embodiment.

With respect to the placement of the lens block 6, the mirror 8 and the prism 7, in the absence of the mirror 8 as shown in FIG. 4(a), the prism 7 reverses the direction of light (input) incident from the ferrule 12 (optical fiber 2) and passing through the collimating lens C2, and emits (outputs) it to the ferrule 11 (optical fiber 1) through the collimating lens C1, as shown by the arrows indicating the direction of travel of the light. On the other hand, in the presence of the mirror 8 as shown in FIG. 4(b), the mirror 8 reflects the light (input) incident from the ferrule 12 (optical fiber 2) and passing through the collimating lens C2, and emits (outputs) it to the ferrule 13 (optical fiber 3) through the collimating lens C3.

The optical coupling surfaces of the lens block 6 with the ferrules 11, 12, 13 are respectively inclined with inclination angles relative to the planes perpendicular to the respective axes of light as described above. Practically, the inclination angles are preferably at least about 5 degrees and at most about 45 degrees, which, in the present embodiment, are e.g. 8 degrees. Further, the ferrule 11 and the ferrule 12 are placed in parallel, while the ferrule 13 is placed at a predetermined angle relative to them. Further, the optical coupling surfaces P2, P3 of the ferrule 12 and the ferrule 13 with the lens block 6 are positioned on the same plane, which is a plane having a posture at an angle different from the optical coupling surface PI of the ferrule 11 with the lens block 6.

The operation of the optical switch of the present embodiment according to the structure described above will now be described with reference to FIG. 3 and FIG. 4 again. As shown in FIG. 4(a), in the absence of the mirror 8 where the mirror 8 is removed from the optical path, the input light incident from the ferrule 12 and passing through the collimating lens C2 is reflected by the prism 7 so as to be reversed in direction, and is output to the ferrule 11 (optical fiber 1) through the collimating lens C1. On the other hand, as shown in FIG. 4(b), in the presence of the mirror 8 where the mirror 8 is inserted in the optical path, the input light incident from the ferrule 12 and passing through the collimating lens C2 is reflected by the mirror 8, and is output to the ferrule 13 through the collimating lens C3.

As described in the foregoing, according to the optical switch of the present embodiment, the respective optical fibers 1, 2, 3 are led out from the one surface side 10a of the device body 10, so that it becomes possible to reduce the size as compared with prior art. Further, since the lens block 6 has the plurality of integrally formed collimating lenses C1, C2, C2, it is possible to improve the accuracy of relative positions of the plurality of collimating lenses, and to improve the optical characteristics of the optical block 5. Furthermore, as compared with the case where the collimating lenses are formed of discrete components, the number of components can be reduced, making it possible to facilitate the assembly work.

Furthermore, the ferrules 11, 12, 13 holding the respective optical fibers 1, 2, 3 are fixed to the lens block 6, so that it is possible to reduce misalignment of optical axes between the respective optical fibers 1, 2, 3 and the respective collimating lenses C1, C2, C3. Note that if ferrules for general use as applied e.g. to optical connectors are used as the ferrules 11, 12, 13, it is possible to further reduce the cost as compared with the case of using ferrules for exclusive use.

According to the present embodiment, in order to impede the light, reflected at the optical coupling surfaces between the lens block 6 and the ferrules 11, 12, 13, from entering the optical fibers so as to improve the amount of reflection attenuation, such optical coupling surfaces are inclined at an angle to some extent relative to the axes of the passing light beam. Since the light receivable angle of a general single-mode fiber used for optical communication is 7 degrees at maximum, it is possible to improve the amount of reflection attenuation by providing the optical coupling surfaces with an angle of 8 degrees relative to planes perpendicular to the axes of the passing light beam as in the present embodiment. If e.g. an adhesive is coated to fix the ferrules so as to bond the optical coupling surfaces, it is preferable that a gap provided at such bonding surfaces is constant over the entire area thereof in order to reduce misalignment of the optical axes due to the influence of curing shrinkage of the adhesive.

Besides, by providing the bonding surfaces between the lens block 6 and the ferrules 11, 12, 13 with an angle equivalent to the angle provided at the end surfaces of the ferrules, the leads of the optical fibers 1, 2, 3 become compact, thereby enabling size reduction.

Furthermore, the lens block 6, the prism 7 and the actuator 9 can be held by one optical bench 15, thereby achieving cost reduction due to the reduction of the number of components. In addition, since the optical bench 15, which positions and fixes the lens block 6, the prism 7 and the actuator 9, is contained in and mounted on the device body 10, it is possible to reduce dead space in the device body 10, and also possible to allow the device body 10 to have a structure in which other than the optical fibers 1, 2, 3 are not exposed to the outside of the device body 10, thereby making it possible to reduce the occupation area.

It is to be noted that the present invention is not limited to the structures according to the above embodiments, and various modifications are possible as long as they do not alter the spirit of the invention. Further, the present application is based on Japanese Patent Application 2004-283813, the content of such patent application being incorporated into the present application by reference.

The invention claimed is:

1. An optical switch for switching combinations of optical paths between a plurality of optical fibers, the optical switch comprising:
 a device body with at least three optical fibers extending out therefrom; and
 a switching optical block housed in the device body so as to be optically coupled to the respective optical fibers, the optical block comprising:
 an integrally formed lens block having one surface side to place the optical fibers on, and comprising three integrally formed collimating lenses positioned side by side in the device body, each collimating lens having a same focal length and configured to position the optical axis of the optical fibers in a same plane, two of the collimating lens having parallel optical axes and the optical axis of the third collimating lens being skewed with respect to the optical axes of the two collimating lenses;
 a prism which is spaced from the lens block on the other surface side of the lens block such that the direction of travel of light incident from one of the optical fibers through the collimating lens is changed, by the prism, to be directed toward a further optical fiber;
 a switching mirror insertable into and removable from between the lens block and the prism; and
 an actuator for driving the mirror,
 wherein the respective optical fibers extend from the one surface side of the device body, and
 optically coupled surfaces of the respective optical fibers are positioned on the respective focal points of the collimating lenses.

2. The optical switch according to claim 1, wherein the lens block has fixed thereto ferrules holding the respective optical fibers, respectively.

3. The optical switch according to claim 2, wherein the bonding surfaces between the lens block and the ferrules are formed by planes inclined at an angle to at least some extent relative to planes perpendicular to axes of passing light beam.

4. The optical switch according to claim 3, wherein the optical block comprises one optical bench contained in and mounted on the device body for positioning and fixing the lens block, the prism and the actuator.

5. The optical switch according to claim 2, wherein the optical block comprises one optical bench contained in and mounted on the device body for positioning and fixing the lens block, the prism and the actuator.

6. The optical switch according to claim 1, wherein the bonding surfaces between the lens block and the ferrules are formed by planes inclined at an angle to at least some extent relative to planes perpendicular to axes of passing light beams.

7. The optical switch according to claim 6, wherein the optical block comprises one optical bench contained in and mounted on the device body for positioning and fixing the lens block, the prism and the actuator.

8. The optical switch according to claim 1, wherein the optical block comprises one optical bench contained in and mounted on the device body for positioning and fixing the lens block, the prism and the actuator.

9. The optical switch according to claim 7, wherein the lens block has fixed thereto ferrules holding the respective optical fibers, respectively.

10. The optical switch according to claim 9, wherein the bonding surfaces between the lens block and the ferrules are formed by planes inclined at an angle to at least some extent relative to planes perpendicular to axes of passing light beam.

11. The optical switch according to claim 10, wherein the optical block comprises one optical bench contained in and mounted on the device body for positioning and fixing the lens block, the prism and the actuator.

12. The optical switch according to claim 9, wherein the optical block comprises one optical bench contained in and mounted on the device body for positioning and fixing the lens block, the prism and the actuator.

13. The optical switch according to claim 1, wherein the bonding surfaces between the lens block and the ferrules are formed by planes inclined at an angle to at least some extent relative to planes perpendicular to axes of passing light beam.

14. The optical switch according to claim 13, wherein the optical block comprises one optical bench contained in and mounted on the device body for positioning and fixing the lens block, the prism and the actuator.

15. The optical switch according to claim 1, wherein the optical block comprises one optical bench contained in and mounted on the device body for positioning and fixing the lens block, the prism and the actuator.

* * * * *